United States Patent
Milicevic et al.

(10) Patent No.: US 9,828,279 B2
(45) Date of Patent: Nov. 28, 2017

(54) METHOD AND DEVICE FOR MANUFACTURING AN OPTICAL PREFORM BY MEANS OF AN INTERNAL VAPOUR DEPOSITION PROCESS, AND A CORRESPONDING SUBSTRATE TUBE ASSEMBLY

(71) Applicant: Draka Comteq B.V., Amsterdam (NL)

(72) Inventors: Igor Milicevic, Amsterdam (NL); Johannes Antoon Hartsuiker, Amsterdam (NL); Mattheus Jacobus Nicolaas Van Stralen, Amsterdam (NL); Gertjan Krabshuis, Amsterdam (NL); Eric Aloysius Kuijpers, Amsterdam (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 15/257,095

(22) Filed: Sep. 6, 2016

(65) Prior Publication Data

US 2016/0376185 A1    Dec. 29, 2016

Related U.S. Application Data

(62) Division of application No. 14/715,987, filed on May 19, 2015, now Pat. No. 9,463,994.

(30) Foreign Application Priority Data

May 22, 2014    (NL) ..................................... 2012866

(51) Int. Cl.
*C03B 37/018*    (2006.01)

(52) U.S. Cl.
CPC ........ *C03B 37/0183* (2013.01); *C03B 37/018* (2013.01); *C03B 37/01807* (2013.01);
(Continued)

(58) Field of Classification Search
CPC .............. C03B 37/0183; C03B 37/018; C03B 37/01807; C03B 37/01846; C03B 37/01892; C03B 2203/16
See application file for complete search history.

(56) References Cited

U.S. PATENT DOCUMENTS

| 6,568,218 B1 | 5/2003 | Mueller et al. |
| 6,789,398 B1 | 9/2004 | Daoud et al. |
| 2015/0336838 A1 | 11/2015 | Milicevic |

FOREIGN PATENT DOCUMENTS

| JP | 53030349 A | 3/1978 |
| JP | 58185446 A | 10/1983 |

(Continued)

OTHER PUBLICATIONS

Search Report for NL 2012866 dated Feb. 2, 2015, 9 pages.

*Primary Examiner* — Queenie Dehghan
(74) *Attorney, Agent, or Firm* — Shumaker, Loop & Kendrick, LLP

(57) ABSTRACT

A device for manufacturing an optical preform by means of an internal vapour deposition process including an energy source, a hollow substrate tube having a supply side and a discharge side and the energy source being moveable along a length of the hollow substrate tube, and an elongation tube connected to the hollow substrate tube at the discharge side thereof, wherein the hollow substrate tube extends into an interior of the elongation tube and an internal diameter of the elongation tube is at least 0.5 millimeters larger than an external diameter of the hollow substrate tube.

4 Claims, 1 Drawing Sheet

(52) U.S. Cl.
CPC .. *C03B 37/01846* (2013.01); *C03B 37/01892* (2013.01); *C03B 2203/16* (2013.01)

(56) References Cited

FOREIGN PATENT DOCUMENTS

| | | | | |
|---|---|---|---|---|
| JP | 58041734 A | 11/1983 | | |
| JP | 59217633 A | 12/1984 | | |
| JP | 2003176148 A | * | 6/2003 | ......... C03B 7/01846 |

* cited by examiner

METHOD AND DEVICE FOR MANUFACTURING AN OPTICAL PREFORM BY MEANS OF AN INTERNAL VAPOUR DEPOSITION PROCESS, AND A CORRESPONDING SUBSTRATE TUBE ASSEMBLY

TECHNICAL FIELD AND BACKGROUND OF THE INVENTION

The present invention relates to a device for manufacturing an optical preform by means of an internal vapour deposition process, the device comprising an energy source and a hollow substrate tube, wherein the hollow substrate tube has a supply side and a discharge side, the energy source being moveable along a length of the hollow substrate tube, the device further comprising an elongation tube connected to the hollow substrate tube at the discharge side thereof.

Generally, in the field of optical fibres, multiple thin films of glass are deposited on the inside surface of a substrate tube. The substrate tube is hollow to allow internal deposition. The substrate tube may be of glass, for example glass gitartz ($SiO_2$). Glass-forming gases (viz. reactive gases comprising gasses for the forming of glass and optionally precursors to dopants) are introduced into the interior of the substrate tube from one end (called the "supply side" of the substrate tube).

Doped or undoped glass layers (depending on the use of reactive gases with or without one or more precursors to dopants, respectively) are deposited onto the interior surface of the substrate tube. The remaining gases are discharged or removed from the other end of the substrate tube called the "discharge side" of the substrate tube. The removal is optionally carried out by means of a vacuum pump. The vacuum pump has the effect of generating a reduced pressure in the interior of the substrate tube, which reduced pressure generally comprises a pressure value ranging between 5 and 50 mbar, i.e. 500 and 5000 Pascal.

Several types of internal chemical vapour depositions (CVD) are known, vapour axial deposition (VAD), modified chemical vapour deposition (MDVD) and plasma-enhanced chemical vapour deposition (PECVD or PCVD). Plasma-enhanced chemical vapour deposition (PECVD or PCVD) is a process used to deposit thin films from a gas state (vapour) to a solid state on a substrate. Chemical reactions are involved in the process, which occur after creation of a plasma of the reacting gasses.

Generally, the plasma is induced by the use of electromagnetic radiation, preferably microwaves. Usually, electromagnetic radiation from a generator are directed towards an applicator via a waveguide, which applicator surrounds the substrate tube. The applicator couples the electromagnetic radiation into a plasma that is generated inside the substrate tube. The applicator is moved reciprocally in the longitudinal direction of the substrate tube. Thus, the plasma formed, also called the "plasma reaction zone", is also moved reciprocally. As a result of this movement a thin vitrified silica layer is deposited onto the interior of the substrate tube with every stroke or pass.

The applicator and the substrate tube are generally surrounded by a furnace so as to maintain the substrate tube at a temperature of 900-1300° C. during the deposition process.

Thus, the applicator is moved in translation over the length of the substrate tube within the boundaries of a furnace which surrounds the substrate tube and the applicator reciprocating within the furnace. With this translational movement of the applicator the plasma also moves in the same direction. As the applicator reaches the inner wall of the furnace near one end of the substrate tube, the movement of the applicator is reversed so that it moves to the other end of the substrate tube towards the other inner wall of the furnace. In other words the applicator and thus the plasma is reciprocating between a reversal point at the supply side and a reversal point at the discharge side of the substrate tube. The applicator and thus the plasma travels a back and forth movement along the length of the substrate tube. Each back and forth movement is call a "pass" or "stroke". With each pass a thin layer of vitrified silica material is deposited on the inside of the substrate tube.

Normally, a plasma is generated only in a part of the substrate tube, viz. the part that is surrounded by the applicator. The dimensions of the applicator are smaller than the dimensions of the furnace and of the substrate tube. Only at the position of the plasma, the reactive gasses are converted into solid glass and deposited on the inside surface of the substrate tube. Since the plasma reaction zone moves along the length of the substrate tube, glass is deposited more or less evenly along the length of the substrate tube.

When the number of passes increases the cumulative thickness of these thin films, i.e. of the deposited material, increases thus leading to a decrease in the remaining internal diameter of the substrate tube. In other words, the hollow space inside the substrate tube keeps getting smaller with each pass.

During the deposition process, the substrate tube is clamped into a glass worker lathe. The applicator moves reciprocally only over a part of said substrate tube. This has the disadvantage that only a part of said, expensive, substrate tube can be used to prepare optical fibers. In order to overcome said problem, it is know e.g. from the publications below, to attach a piece of lower quality glass tube, e.g. a so-called elongation tube, to at least the discharge side of said substrate tube. This elongates the total length of the tube. The elongation tubes are clamped into the glass working lathe which increases the effective length of the substrate tube that can be used for deposition.

From European patent application EP 1,801,081 in the name of the present applicant, a device is disclosed for manufacturing an optical preform by means of an internal vapour deposition process, wherein an insertion tube is present in the interior of the substrate tube, at the discharge side, wherein the external diameter and the shape of the insertion tube substantially correspond to the internal diameter and the shape of the substrate tube, and wherein the insertion tube extends beyond the substrate tube. In other words, the insertion tube is inserted in the end of the substrate tube.

From Japanese patent application JP 2003-176148 a method of manufacturing a preform of an optical fibre is known, comprising coaxially attaching an exhaust tube to a quartz tube.

From U.S. Pat. No. 4,389,229 a method of fabricating a light guide preform by a modified chemical vapour deposition process is known, wherein undeposited reactants pass through a glass substrate tube and flow into a reactant exhaust system and are carried therethrough by a uniformly flowing reactant-free gas. The reactants pass through an exhaust tube, a reactant collection chamber, through a pressure control apparatus and into a gas scrubber. The pressure within the exhaust system is maintained substantially constant during the process by continuously monitoring the pressure therein and adjusting the pressure control apparatus accordingly.

From European patent application EP 1,988,062 a device and a method for manufacturing an optical preform by means of an internal vapour deposition process are known, comprising an energy source and a substrate tube, which substrate tube has a supply side for supplying glass-forming precursors and a discharge side for discharging components which have not been deposited on the interior of the substrate tube, whilst the energy source is movable along the length of the substrate tube between a reversal point on the supply side and a reversal point on the discharge side.

One drawback of, for example, the Japanese patent application JP 2003-176148 is that glassy material deposited outside the deposition area in an internal vapour deposition process gives raise to mechanical stress build-up in the substrate tube. This mechanical stress may lead to the substrate tube to break during the optical preform production, which is undesirable.

Another drawback of the known devices comprising elongation tubes attached to the discharge side of the substrate tube is that the connection between the elongation tube and the hollow substrate tube is subjected to a mechanical tension during the following collapsing step which might result in cracking of the substrate tube or resulting primary preform which is undesirable.

In the prior art there is additional problem that may lead to cracking of the substrate tube or primary preform, being the presence of soot inside of the elongation tube. When the internal deposition process is completed the substrate tube having deposited layers of glass on the inside surface thereof is removed, often still having a very high temperature, such as e.g. 800-900 degrees Celsius. When this substrate tube is then slightly tilted, a so-called chimney effect arises causing part of the soot to flow into the substrate tube causing pollution of the glass layers. When the soot is not removed, it might cause cracking during the collapsing process due to mechanical stress applied to said elongation tube. This can be overcome by manually removing said soot from said elongation tube prior to tilting it, but this is difficult to do due to the high temperature.

This problem has previously been solved in the prior art by introducing an insertion tube into the substrate tube. This insertion tube "catches" the soot and can be easily removed from the substrate tube before the subsequent collapsing.

A drawback of the known devices in which an insertion tube is inserted into the substrate tube is that this leads to the built up of undesired glassy deposition on the inner surface of the substrate on the longitudinal position adjacent the insertion tube which glassy deposition leads to an increase in crack formation. This will be explained in more detail below.

BRIEF SUMMARY OF THE INVENTION

It is an object of the present invention to provide for a device for manufacturing an optical preform by means of an internal vapour deposition process in which the internal stress build-up in the glass caused by glasses deposited just outside the deposition area, as well as the mechanical tension of the connection between the hollow insertion tube and the hollow substrate tube is reduced.

It is another object of the present invention to provide for a method for manufacturing an optical preform by means of an internal vapour deposition process, in which the above mentioned internal stress build-up and the mechanical tension is avoided, or at least reduced.

It is another objection of the present invention to provide a substrate tube assembly without the drawbacks of the prior art.

The above mentioned objects are achieved by the present invention.

The present invention relates in a first aspect to a device, in a second aspect to a method, and in the third aspect to a substrate tube assembly.

In said first aspect, the present invention relates to a device for manufacturing an optical preform by means of an internal vapour deposition process, the device comprising an energy source and a hollow substrate tube, which hollow substrate tube has a supply side and a discharge side, the energy source being moveable along a length of the hollow substrate tube, the device further comprising an elongation tube connected to the hollow substrate tube at the discharge side thereof, wherein in that the hollow substrate tube extends into an interior of the elongation tube and in that an internal diameter of the elongation tube is at least 0.5 millimeters larger than an external diameter of the hollow substrate tube.

In an embodiment of said aspect, the hollow substrate tube extends into the interior of said elongation tube with a length between 0.5 and 10 centimeters.

In an embodiment of said aspect, the hollow substrate tube extends into the interior of said elongation tube with a length between 2 and 5 centimeters.

In an embodiment of said aspect, the hollow substrate tube extends into the interior of said elongation tube with a length between 2.5 and 3.5 centimeters.

In another embodiment of said aspect, the internal diameter of the elongation tube is between 0.5 and 5 millimeters larger than the external diameter of the hollow substrate tube.

In another embodiment of said aspect, the internal diameter of the elongation tube is between 1 and 2 millimeters larger than the external diameter of the hollow substrate tube.

In another embodiment of said aspect, the elongation tube comprises a hollow insertion tube.

In another embodiment of said aspect, said hollow insertion tube is placed coaxially with respect to said elongation tube.

In another embodiment of said aspect, said insertion tube is oriented in line with the hollow substrate tube.

In another embodiment of said aspect, said insertion tube is mounted in line with said hollow substrate tube.

In another embodiment of said aspect, the insertion tube is oriented such that a spacing between one end of the hollow insertion tube and one end of the hollow substrate tube that extends into the interior of said elongation tube is at least 0.5 millimeters, preferably at least 2 millimeters.

In another embodiment of said aspect, the internal diameter of the hollow insertion tube is at least equal to the internal diameter of the hollow substrate tube.

In another embodiment of said aspect, the elongation tube is connected to the hollow substrate tube at one end of the elongation tube.

In said second aspect, the present invention relates to a method for manufacturing a precursor for a primary preform by means of an internal vapour deposition process, wherein glass-forming precursors are supplied to a hollow substrate tube on a supply side thereof, which substrate tube further has a discharge side, wherein an energy source is moved along a length of the hollow substrate tube for the purpose of generating deposition conditions in the hollow substrate tube, and wherein a plurality of glass layers is deposited on the inner surface of said substrate tube to form said precursor for a primary preform, wherein an elongation tube is mounted over the hollow substrate tube, at the discharge side thereof, such that the hollow substrate tube extends into an interior of the elongation tube, and in that an internal diameter of the elongation tube is at least 0.5 millimeters larger than an external diameter of the hollow substrate tube.

In an embodiment of said aspect, the hollow substrate tube extends into the interior of said elongation tube with a length between 0.5 and 10 centimeters. In other words, the hollow substrate tube and the elongation tube are positioned with respect to each other in such a manner that the hollow substrate tube extends into the interior of said elongation tube with a length between 0.5 and 10 centimeters.

In an embodiment of said aspect, the hollow substrate tube extends into the interior of said elongation tube with a length between 2 and 5 centimeters. In other words, the hollow substrate tube and the elongation tube are positioned with respect to each other in such a manner that the hollow substrate tube extends into the interior of said elongation tube with a length between 2 and 5 centimeters.

In an embodiment of said aspect, the hollow substrate tube extends into the interior of said elongation tube with a length between 2.5 and 3.5 centimeters. In other words, the hollow substrate tube and the elongation tube are positioned with respect to each other in such a manner that the hollow substrate tube extends into the interior of said elongation tube with a length between 2.5 and 3.5 centimeters.

In an embodiment of said aspect, the internal diameter of the elongation tube is between 0.5 and 5 millimeters larger than the external diameter of the hollow substrate tube. In other words, the hollow substrate tube and the elongation tube are positioned with respect to each other in such a manner that the internal diameter of the elongation tube is between 0.5 and 5 millimeters larger than the external diameter of the hollow substrate tube.

In an embodiment of said aspect, the internal diameter of the elongation tube is between 1 and 2 millimeters, larger than the external diameter of the hollow substrate tube. In other words, the hollow substrate tube and the elongation tube are positioned with respect to each other in such a manner that the internal diameter of the elongation tube is between 1 and 2 millimeters larger than the external diameter of the hollow substrate tube.

In an embodiment of said aspect, the elongation tube comprises a hollow insertion tube oriented and mounted in line with the hollow substrate tube such that a spacing between one end of the hollow insertion tube and one end of the hollow substrate tube that extends into the interior of said elongation tube is at least 0.5 millimeters.

In an embodiment of said aspect, the elongation tube comprises a hollow insertion tube oriented and mounted in line with the hollow substrate tube such that a spacing between one end of the hollow insertion tube and one end of the hollow substrate tube that extends into the interior of said elongation tube is at least 2 millimeters.

In an embodiment of said aspect, an internal diameter of the hollow insertion tube is at least equal to an internal diameter of the hollow substrate tube.

In an embodiment of said aspect, the elongation tube is connected to the hollow substrate tube at one end of the elongation tube.

In said third aspect, the present invention relates to a substrate tube assembly for use in an internal vapour deposition process, the substrate tube assembly comprising a hollow substrate tube having a supply side and a discharge side wherein the substrate. tube assembly comprises an elongation tube mounted over the hollow substrate tube, at the discharge side thereof; wherein the hollow substrate tube extends into an interior of the elongation tube, and in that an internal diameter of the elongation tube is at least 0.5 millimeters larger than an external diameter of the hollow substrate tube.

In an embodiment of said aspect, the hollow substrate tube extends into the interior of said elongation tube with a length between 0.5 and 10 centimeters. In an embodiment of said aspect, the hollow substrate tube extends into the interior of said elongation tube with a length between 2 and 5 centimeters.

In an embodiment of said aspect, the hollow substrate tube extends into the interior of said elongation tube with a length between 2.5 and 3.5 centimeters.

In an embodiment of said aspect, the internal diameter of the elongation tube is between 0.5 and 5 millimeters larger than the external diameter of the hollow substrate tube.

In an embodiment of said aspect, the internal diameter of the elongation tube is between 1 and 2 millimeters larger than the external diameter of the hollow substrate tube.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
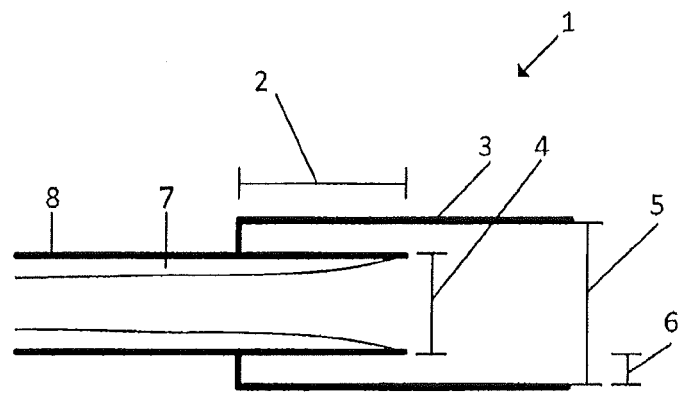
FIG. 1 illustrates a first example of a substrate tube assembly according to the present invention.

The following definitions are used in the present description and/or claims to define the stated subject matter. Other terms not cited below are meant to have the generally accepted meaning in the field.

"Hollow substrate tube" as used in the present description means: an elongation tube having a cavity within. Generally, the inside of said tube is provided (or coated) with a plurality of glass layers during the manufacturing of a preform.

"Gas supply side" or "supply side" as used in the present description means; one side of the substrate tube, being an open end of the substrate tube that is used as inlet for the gases. The supply side is the side opposite to the discharge side.

"Gas discharge side" or "discharge side" as used in the present description means: one side of the substrate tube, being an open end of the substrate tube that is used as outlet for the gases. The discharge side is the side opposite to the supply side.

"Interior surface" as used in the present description means: the inside surface or inner surface of the hollow substrate tube.

"Glass" or "glass material" as used in the present description means: crystalline or vitreous (glassy) oxide material—e.g. silica ($SiO_2$) or even quartz—deposited by means of a vapour deposition process.

"Silica" as used in the present description means: any substance in the form of SiOx, whether or not stoichiometric, and whether or not crystalline or amorphous.

"Glass-forming gases" as used in the present description means: reactive gases used during the deposition process to form glass layers. These glass forming gases may comprise a precursor for a dopant. (e.g. $O_2$ and $SiCl_4$ and optionally others).

"Reaction zone" as used in the present description means: the zone or axial location wherein the glass-forming reaction or deposition takes place. This zone is formed by a plasma and preferably moves reciprocally along the longitudinal length of the substrate tube.

"Plasma" as used in the present description means: an ionized gas consisting of positive ions and free electrons in proportions resulting in more or less no overall electric charge at very high temperatures. The plasma is usually induced by microwaves.

"Reversal point" as used in the present description means: the axial point or position on the substrate tube at which the movement of the applicator reciprocates. In other words, changes from back to forth and forth to back. It is the turning point of the applicator. The axial point is measured at the middle (longitudinal) of the applicator.

"Near the reversal point" as used in the present description means: an axial position on the substrate tube that is close in distance to the reversal point, or is the same position as the reversal point.

"At the reversal point" as used in the present description means: an axial position on the substrate tube that is the same position as the reversal point.

"Moved back and forth" as used in the present description means: a reciprocating movement or moving backwards and forwards in a straight line.

"Stroke" or "pass" as used in the present description means: each back and forth movement of the applicator along the length of the substrate tube.

"Elongation tube" as used in the present description means: a glass tube that is attached to at least the discharge side of the substrate tube in order to elongate the substrate tube.

"Insertion tube" as used in the present description means: a glass tube that is inserted into the substrate tube and/or the elongation tube. The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a device for manufacturing an optical preform or a particular method for manufacturing the optical preform.

The present invention relates, in a first aspect, to a device for manufacturing an optical preform by means of an internal vapour deposition process, the device comprising an energy source and a hollow substrate tube, wherein the hollow substrate tube has a supply side and a discharge side, the energy source being moveable along a length of the hollow substrate tube, the device further comprising an elongation tube connected, in a substantially air-tight manner, to the hollow substrate tube at the discharge side thereof, wherein the hollow substrate tube extends into an interior of the elongation tube, thereby defining an overlapping region between the hollow substrate tube and the elongation tube, and in that an internal diameter of the elongation tube at the overlapping region is at least 0.5 millimeters larger than an external diameter of the hollow substrate tube at the overlapping region.

In other words, the elongation tube is provided coaxially over one end of the substrate tube.

The invention is based on the finding by the inventors that, in case the hollow substrate tube extends into the interior of the elongation tube, the mechanical stress build-up may be reduced. The inventors have found that the mechanical stress build-up may be caused by the following.

The inventors noted that the mechanical tension between the elongation tube and the hollow substrate tube is avoided, or at least reduced, in case the hollow substrate tube extends into the interior of the elongation tube. This, due to the fact that the elongation tube may be connected to the outer surface of the hollow substrate tube, along the circumference thereof spatially distant by e.g. at least 2.5 centimeters from the end face of the substrate tube, instead of a connection of the end face of the elongation tube to the end face of the hollow substrate tube. This provides for a better rigid connection between these tubes.

In the context of the present invention, the energy source may be a traversing applicator moveable along the length of the substrate tube between a point of reversal at the supply side thereof and a point of reversal at the discharge side thereof for generating deposition conditions inside the hollow substrate tube.

In an embodiment, the elongation tube is fused to the hollow substrate tube. In an embodiment, the hollow substrate tube extends into the interior of the elongation tube with a length between 0.5 and 10 centimeters, preferably between 2 and 5 centimeters, even more preferably between 2.5 and 3.5 centimeters.

It is noted that in case the length of the overlapping region is approximately of the above mentioned length, the connection between the elongation tube and the hollow substrate tube becomes more rigid, i.e. more reliable. This provides less change of breaking or cracking of the preform.

In another embodiment, the internal diameter of the elongation tube at the overlapping region is between 0.5 and 5 millimeters, preferably between 1-2 millimeters, larger than the external diameter of the hollow substrate tube at the overlapping region.

An advantage of this embodiment is that inner diameter of the elongation tube does not have physical contact with the outer surface of the substrate tube at the end face thereof. Since the end face of the substrate tube is spatially distant from the inner surface of the substrate tube, there is no continuation of glass deposit. In other words, glass deposited in the elongation tube is not in (physical) connection with the glass deposited in the interior of the hollow substrate tube. Any mechanical tensions or the like occurring in the glass deposited on the elongation tube will not propagate to the glass deposited in the interior of the hollow substrate tube. This preserves the quality of the substrate tube.

Another advantage is that the joining position, i.e. the position at which the elongation tube connected to the hollow substrate tube, is shifted upwards of the hollow substrate tube resulting in an even more rigid connection between these tubes.

Yet another advantage of this embodiment is that the spacing between the elongation tube and the hollow substrate tube provides the possibility that an insertion tube may be accurately mounted in line with the hollow substrate tube, as, for example, the diameter of the insertion tube may be matched to the diameter of the hollow substrate tube. This relates to an embodiment discussed in more detail below.

Further, according to the present invention, an insertion tube may be used for draining or discharging gasses not deposited in the hollow substrate tube. Moreover, the insertion tube is used to "catch" any additional deposition outside of the heat source region. After the deposition process is finished, the insertion tube is removed from the elongation tube and together with this the deposition of unwanted glass is removed. The substrate tube and attached elongation tube is then ready for the next step in the process, being the collapsing step.

The present inventors have found that the presence of an insertion tube inserted into the end of the substrate tube may lead to the built up of addition, internal stress in addition to the mechanical stress discussed above. The present inventors believe that this stress built up is the result of two points.

The first point is related to turbulence of the glass-forming gasses exiting the hollow substrate tube and entering the hollow insertion tube. In case that the insertion tube is inserted into the end of the substrate tube, for example, the diameter of the hollow insertion tube does not substantially match the diameter of the hollow substrate tube, a mismatch between the hollow channels of the substrate tube and the insertion tube give raise to such a turbulence. This is the case when an insertion tube having an external diameter (and internal diameter) smaller that the internal diameter of the substrate tube is inserted into one end of the substrate tube. This turbulence will lead to the deposition of glass having a different composition that is more prone to cracking.

The second point being that the composition of the glass deposited at the end of the discharge side of the hollow substrate tube differs from the glass in the rest of the substrate tube. It appears that the composition of the glassy deposition here is different compared to other regions of the deposition area. Without wishing to be bound by any theory, the inventors believe that the doping level is higher in the glassy deposition near the insertion tube, probably due to the turbulence which might lead to a locally decreased temperature at the discharge side. It was found out that this glass is more prone to cracking.

The present invention provides a device that solves the above problems. The insertion tube is not inserted into the end of the substrate tube but into the elongation tube.

Usually, the insertion tube is connected to a pump arranged for creating a low pressure in the insertion tube such that the glass-forming gases are sucked through the hollow substrate tube and the insertion tube.

In an even further embodiment, the elongation tube comprises a hollow insertion tube having an internal diameter greater than or equal to an internal diameter of the substrate tube.

The advantage of the use of an insertion tube is that no glass is deposited on the interior of the elongation tube, such that the interior of the elongation tube does need to be swiped clean when the internal vapour deposition process is finished. In such a case, only the insertion tube needs to he removed.

In another embodiment, an end face of the hollow insertion tube is located in the overlapping region, between the outer diameter of the hollow substrate tube and the inner diameter of the elongation tube.

In another embodiment, the hollow insertion tube is oriented and mounted in line with the hollow substrate tube such that a distance between the hollow insertion tube and the hollow substrate tube is at least 0.5 millimeters, preferably at least 2 millimeters.

This embodiment provides the advantage that turbulence of the glass-forming gasses between the hollow substrate tube and the insertion tube is avoided, or at least reduced, as no mismatch between the two channels of the hollow substrate tube and the insertion tube exists.

In yet another embodiment, the elongation tube is connected to the outer surface of the hollow substrate tube at an end face of the elongation tube.

The present invention relates, in a second aspect, to a method for manufacturing a precursor for a primary preform by means of an internal vapour deposition process, wherein glass-forming precursors are supplied to a hollow substrate tube on a supply side thereof, which substrate tube further has a discharge side, wherein an energy source is moved along a length of the hollow substrate tube for the purpose of generating deposition conditions in the hollow substrate tube, and wherein a plurality of glass layers is deposited on the inner surface of said substrate tube to form said precursor for a primary preform, wherein an elongation tube is mounted over, and connection, in a substantially air-tight manner, to the hollow substrate tube, at the discharge side thereof, such that the hollow substrate tube extends into an interior of the elongation tube, thereby defining an overlapping region between the hollow substrate tube and the elongation tube, and in that an internal diameter of the elongation tube at the overlapping region is at least 0.5 millimeters larger than an external diameter of the hollow substrate tube at the overlapping region.

In this process a precursor for a primary preform is obtained or in other words a substrate tube having deposited layers of glass on its inside surface thereof. After this process this precursor may be subjected to a collapsing process after which a primary preform may be obtained. Said primary preform may be overeladded or sleeved to obtain a final preform that is used for drawing optical fibers.

During this process, preferably a plasma deposition process is used, e.g. PCVD.

The first step in this method is the provision of a hollow substrate tube and the supply of glass-forming gasses into said hollow substrate tube via the supply side thereof. An energy source is moved along a length of the hollow substrate tube for the purpose of generating deposition conditions or a so-called reaction zone in the hollow substrate tube, e.g. by the generation of a plasma. This ensures that a plurality of glass layers is deposited on the inner surface of said substrate tube to form said precursor for a primary preform.

According to the present invention an elongation tube is mounted over the hollow substrate tube, at the discharge side thereof, such that the hollow substrate tube extends into an interior of the elongation tube, and in that an internal diameter of the elongation tube is at least 0.5 millimeters larger than an external diameter of the hollow substrate tube.

In other words, the end face of the substrate tube is not in physical connection with the inner surface of the elongation tube. The advantages thereof have been discussed above for the first aspect.

In an embodiment of the method, the elongation tube is fused to the hollow substrate tube.

In an embodiment of the method, the hollow substrate tube extends into the interior of the elongation tube with a length, i.e. defining the overlapping region, between 0.5 and 10 centimeters, preferably between 2 and 5 centimeters, even more preferably between 2.5 and 3.5 centimeters.

In a further embodiment of the method the internal diameter of the elongation tube at the overlapping region is between 0.5 and 5 millimeters, preferably between 1-2 millimeters, larger than the external diameter of the hollow substrate tube at the overlapping region.

In another embodiment of the method, the elongation tube comprises a hollow insertion tube having an internal diameter greater than or equal to an internal diameter of the substrate tube.

In another embodiment of the method, an end face of the hollow insertion tube is located in the overlapping region, between the outer diameter of the hollow substrate tube and the inner diameter of the elongation tube.

In yet another embodiment of the method the hollow insertion tube is oriented and mounted in line with the hollow substrate tube such that a distance between the hollow insertion tube and the hollow substrate tube is at least 0.5 millimeters, preferably at least 2 millimeters.

In an even further embodiment of the method the elongation tube is connected to the outer surface of the hollow substrate tube at one end face of the elongation tube.

The elongation tube may be connected, i.e. fused, to the hollow substrate tube in a perpendicular manner, or under an angle.

Different aspects applicable to the examples of the methods according to the present invention, including the advantages thereof, correspond to the aspects applicable for the devices according to the present invention, as explained above.

The present invention relates, in a third aspect, to a substrate tube assembly for use in an internal vapour deposition process, the substrate tube assembly comprising a hollow substrate tube having a supply side and a discharge side such that glass-forming precursors may be supplied through the hollow substrate tube via the supply side thereof, wherein the substrate tube assembly comprises an elongation tube mounted over, and connect, in a substantially air-tight manner to, the hollow substrate tube, at the discharge side thereof, such that the hollow substrate tube extends into an interior of the elongation tube, thereby defining an overlapping region between the hollow substrate tube and the elongation tube, and in that an internal diameter of the elongation tube at the overlapping region is at least 0.5 millimeters larger than an external diameter of the hollow substrate tube at the overlapping region.

In an embodiment hereof the elongation tube is fused to the hollow substrate tube.

In an embodiment thereof the hollow substrate tube extends into the interior with a length between 0.5 and 10 centimeters, preferably between 2 and 5 centimeters; even more preferably between 2.5 and 3.5 centimeters.

In another embodiment, the internal diameter of the elongation tube at the overlapping region is between 0.5 and 5 millimeters, preferably between 1-2 millimeters, larger than the external diameter of the hollow substrate tube at the overlapping region.

FIG. 1 discloses a first example of a substrate tube assembly 1 according to the present invention.

The substrate tube assembly 1 is to be used in an internal vapour deposition process, such as a plasma vapour deposition process, wherein layers of glass 7 are deposited on the interior of an hollow substrate tube 8. During such a process, glass-forming precursors are supplied through the hollow substrate tube 8, and at the same time an applicator is used for generating electromagnetic radiation into a plasma that is generated inside the substrate tube 8.

FIG. 1 discloses the discharge side of the hollow substrate tube 8, i.e. the side at which the glass-forming precursors exit the hollow substrate tube 8.

According to the present invention an elongation tube 3 is mounted over the hollow substrate tube 8, at the discharge side of the hollow substrate tube 8, wherein the hollow substrate tube 8 extend into an interior of the elongation tube 3. Further, the internal diameter 5 of the elongation tube at the overlapping region 2 is at least 0.5 millimeters larger than an external diameter 4 of the hollow substrate tube 8 at the overlapping region 2.

In the present situation the hollow substrate tube 8 extends into the interior with a length 2 of approximately 3.5 centimeters. According to an embodiment of the present invention, the length at which the hollow substrate tube 8 extends into the elongation tube 3 should be in the range between 0.5 and 10 centimeters. This avoids mechanical stress build up at the connection point, i.e., the connection between the hollow substrate tube 8 and the elongation tube 3.

Further, the internal diameter 5 of the elongation tube, at least at the overlapping region 2, is larger than the external diameter 4 of the hollow substrate tube 8. This provides the advantage that glass deposited in the interior of the elongation tube 3 (not shown) is not in contact with the deposited glass 7 in the interior of the hollow substrate tube 8. As such any imperfections occurring the glass deposited in the interior of the elongation tube 3 cannot propagate into the deposited glass 7 in the hollow substrate tube 8.

The difference in the diameters 4, 5 should be chosen such that the spacing 6 between the hollow substrate tube 8 and the elongation tube 3 is between 0.25 millimeters and 2.5 millimeters, preferably somewhere between 0.5-1 millimeter.

Figure 2:
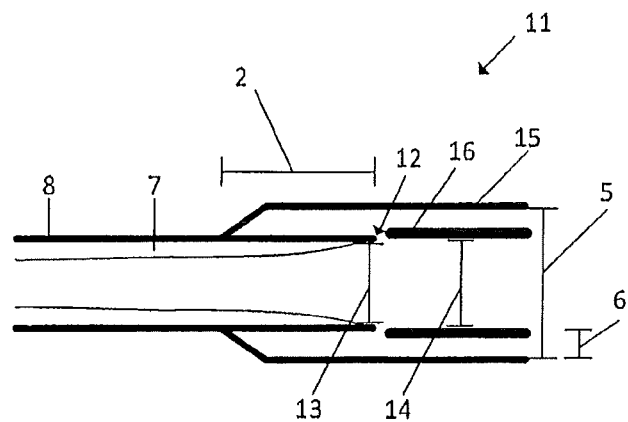
FIG. 2 illustrates a second example of a substrate tube assembly according to the present invention.

FIG. 2 discloses a second example of a substrate tube assembly 11 according to the present invention.

Figure 3:
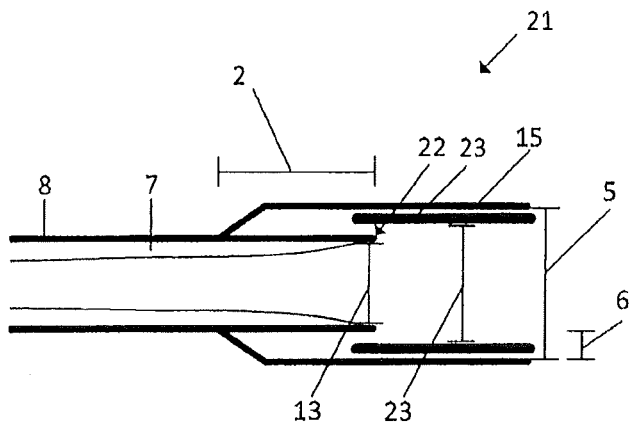
FIG. 3 illustrates a third example of a substrate tube assembly according to the present invention.

Parts or aspects in FIGS. 2 and 3 having the same reference numeral as in FIG. 1 indicate the same or similar parts or aspects.

According to the example shown in FIG. 2, an insertion tube 16 is placed, i.e. mounted, within the elongation tube 15, which insertion tube is mounted in line with the hollow substrate tube 8. This means that a longitudinal axis of the hollow substrate tube 8 is aligned with the longitudinal axis of the insertion tube 16. A distance 12 between the hollow substrate tube 8 and the insertion tube 16 is advantageous, according to the present invention, as glass deposited in the interior of the insertion tube 16 is not in contact with the deposited glass 7 in the interior of the hollow substrate tube 8. As such, any inaccuracies of the deposited glass in the insertion tube 16 cannot traverse towards the deposited glass in the interior of the hollow substrate tube 8.

In order to combat any turbulence of the glass-forming precursors between the transition of the hollow substrate tube to the insertion tube 16, the internal diameter 14 of the insertion tube 16 should be at least equal to the internal diameter of the hollow substrate tube 13. In all embodiments of the present invention, not merely this embodiment of FIG. 2, small tolerances of about 5% between these diameters are acceptable. In case the internal diameter 14 of the insertion tube is smaller than the internal diameter 13 of the hollow substrate tube 8, it is likely that turbulence occurs at the transition area between the substrate tube 8 and the insertion tube 15, resulting in a deposition of an inferior quality of glass 7 at the discharge end of the hollow substrate tube 8.

FIG. 3 discloses a third example of a substrate tube assembly 21 according to the present invention.

The difference between the substrate tube assembly 21 of FIG. 2 compared to the substrate tube assembly 11 of FIG. 2 is that the hollow substrate tube 8 also extend into the interior of the insertion tube 23. As long as the internal diameter 23 of the insertion tube 23 is larger than the internal diameter of the hollow substrate tube 13, a spacing 22 between the substrate tube 8 and the insertion tube 23 will be created. The spacing 22 makes sure that there is no physical contact between the glass deposited in the insertion tube, i.e. residual soot, and glass deposited 7 on the interior of the substrate tube 8.

The embodiments discussed above for any one of the aspects of the invention are also applicable to the other aspects of the invention, unless stated otherwise, The present invention is not limited to the embodiments as disclosed above, and can be modified and enhanced by those skilled in the art beyond the scope of the present invention as disclosed in the appended claims without having to apply inventive skills.

What is claimed is:

1. A method for manufacturing a precursor for a primary preform by an internal vapor deposition process comprising:
   providing a hollow substrate tube having a supply side and a discharge side;
   supplying glass-forming precursors to the hollow substrate tube on the supply side thereof and moving an energy source along a length of the hollow substrate tube thereby generating deposition conditions in the hollow substrate tube; and
   depositing a plurality of glass layers on an inner surface of the substrate tube to form the precursor for a primary preform, wherein:
   an elongation tube is mounted over, and connected, in a substantially air-tight manner, to the hollow substrate tube at the discharge side thereof such that the hollow substrate tube extends into an interior of the elongation tube, thereby defining an overlapping region between the hollow substrate tube and the elongation tube;
   an internal diameter of the elongation tube at the overlapping region is at least 0.5 millimeters larger than an external diameter of the hollow substrate tube at the overlapping region; and
   the elongation tube further comprises a hollow insertion tube positioned inside its inner diameter such that the hollow insertion tube is aligned with and adjacent to the hollow substrate tube, the hollow insertion tube having an internal diameter greater than or equal to an internal diameter of the hollow substrate tube.

2. The method according to claim 1, wherein the elongation tube is fused to said hollow substrate tube.

3. The method according to claim 1, wherein the hollow substrate tube extends into the interior of the elongation tube a length between 0.5 and 10 centimeters.

4. The method according to claim 1, wherein the internal diameter of the elongation tube at the overlapping region is between 0.5 and 5 millimeters larger than the external diameter of the hollow substrate tube at the overlapping region.

* * * * *